Jan. 2, 1934.     A. R. RIDDERSTROM     1,942,363
FOLDING MACHINE
Filed May 3, 1932     12 Sheets-Sheet 1

INVENTOR.
ANDREW R. RIDDERSTROM
BY Geo. K. Woodworth
ATTORNEY.

Jan. 2, 1934.    A. R. RIDDERSTROM    1,942,363
FOLDING MACHINE
Filed May 3, 1932    12 Sheets-Sheet 3
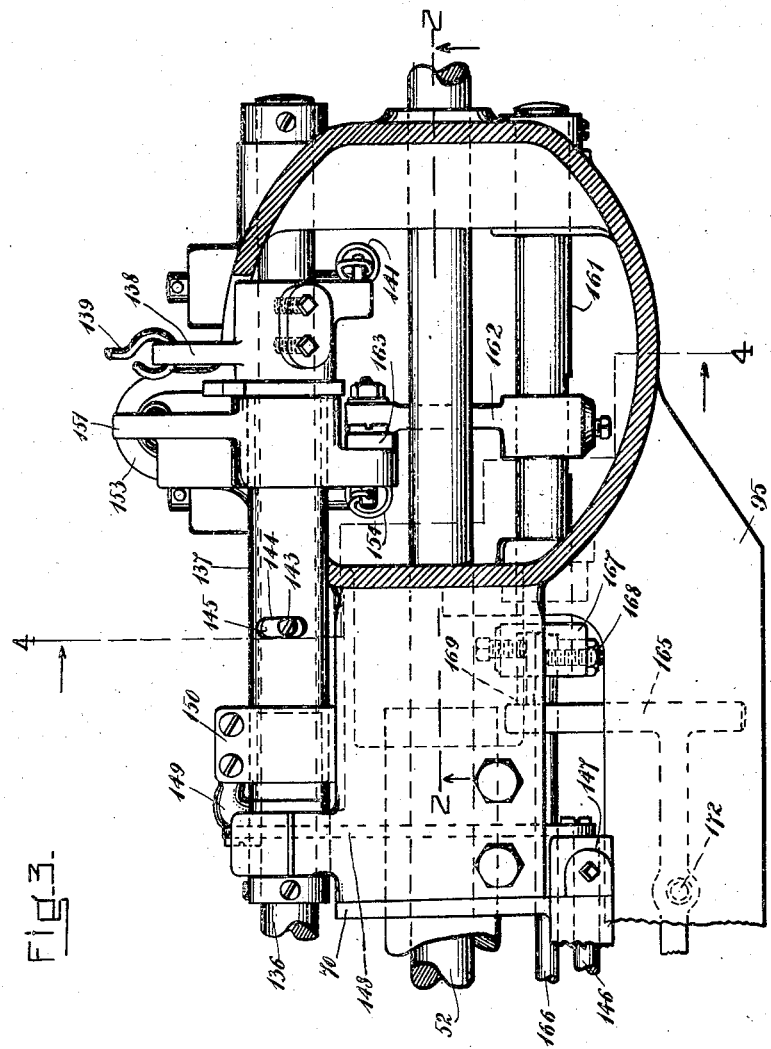
INVENTOR.
ANDREW R. RIDDERSTROM
BY
ATTORNEY.

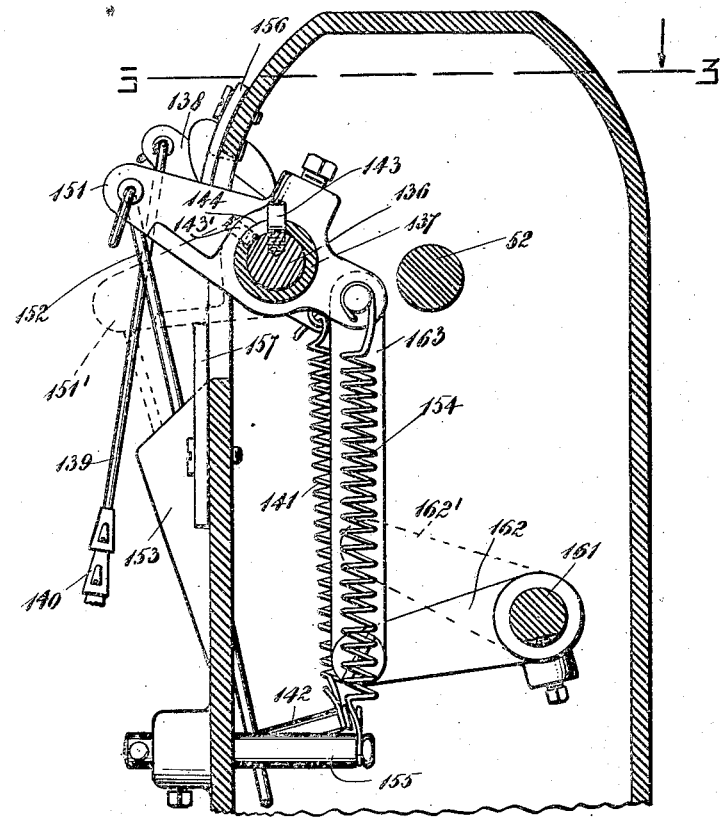
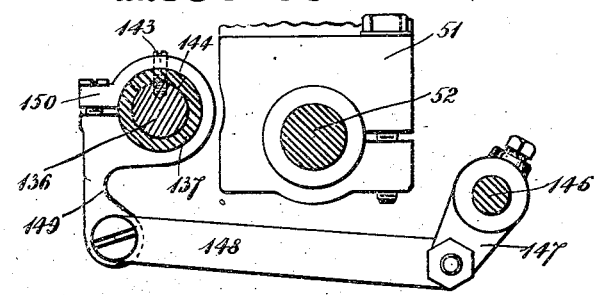

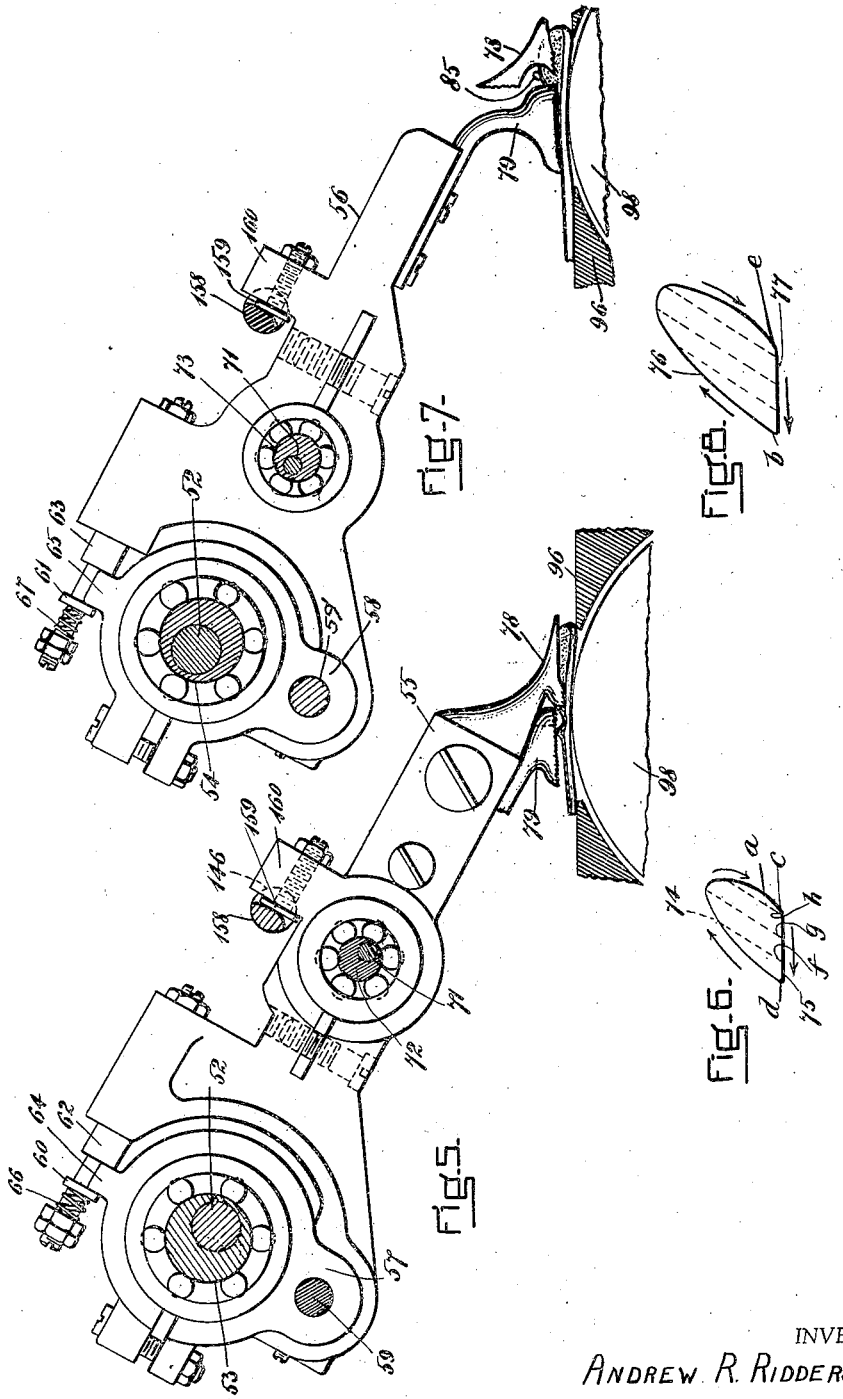

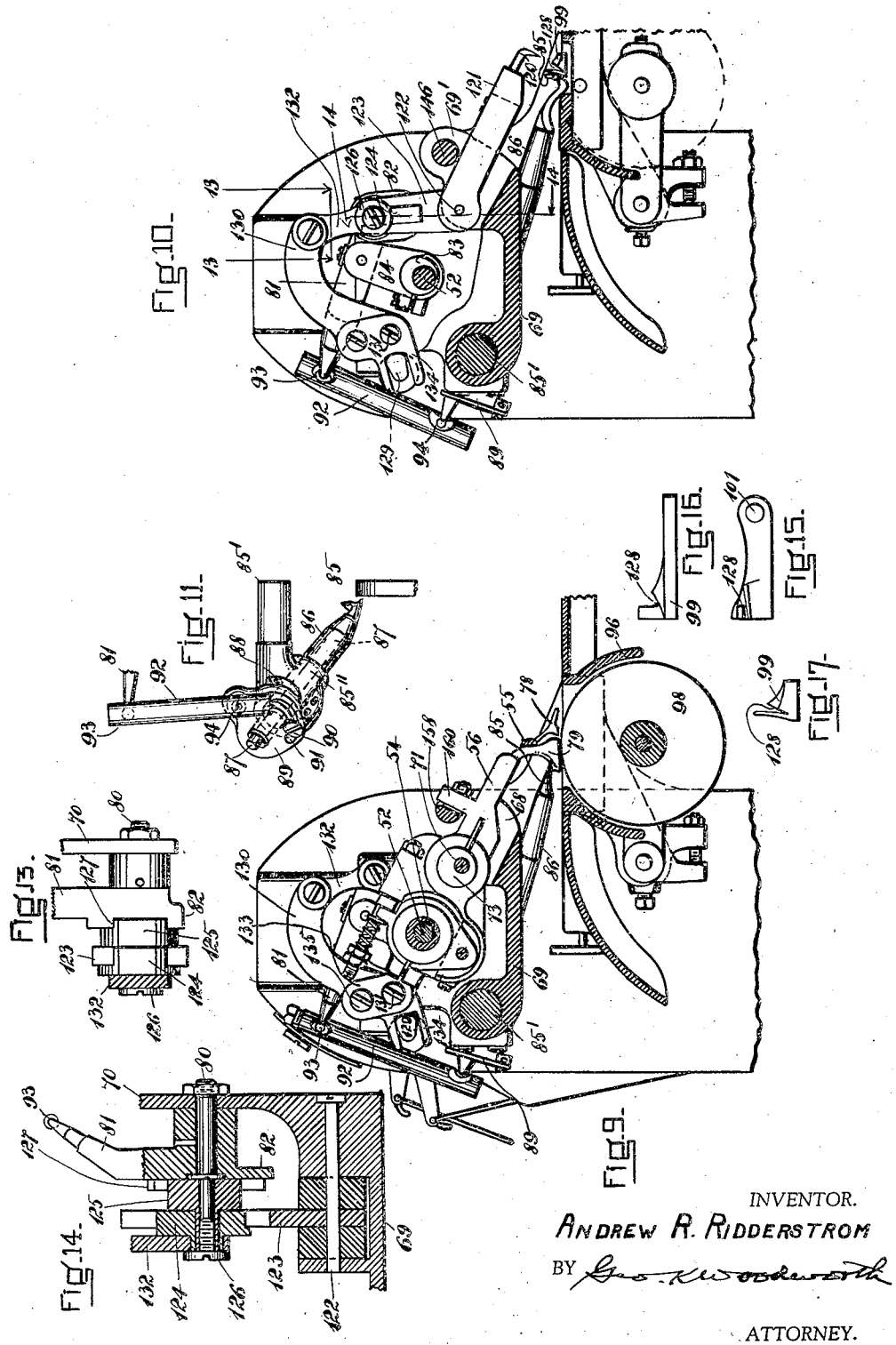

Jan. 2, 1934.  A. R. RIDDERSTROM  1,942,363
FOLDING MACHINE
Filed May 3, 1932   12 Sheets-Sheet 7
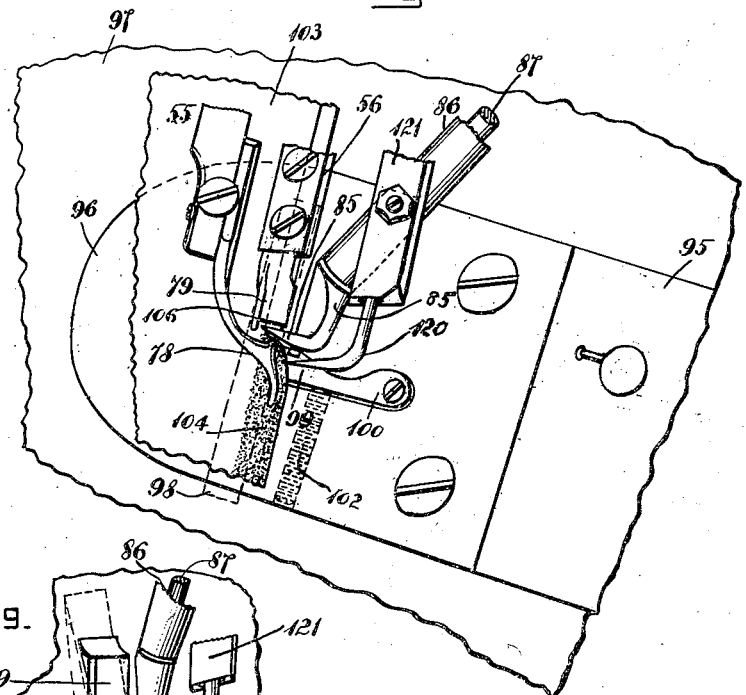
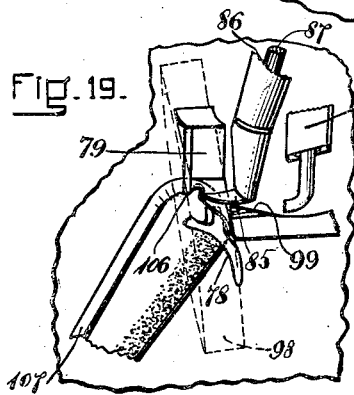
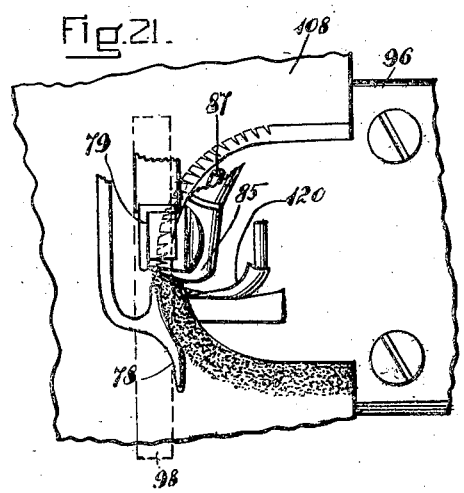
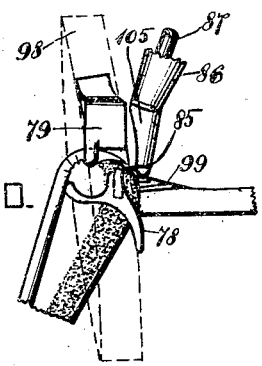
INVENTOR.
ANDREW R. RIDDERSTROM
BY
ATTORNEY.

Jan. 2, 1934.  A. R. RIDDERSTROM  1,942,363
FOLDING MACHINE
Filed May 3, 1932   12 Sheets-Sheet 8
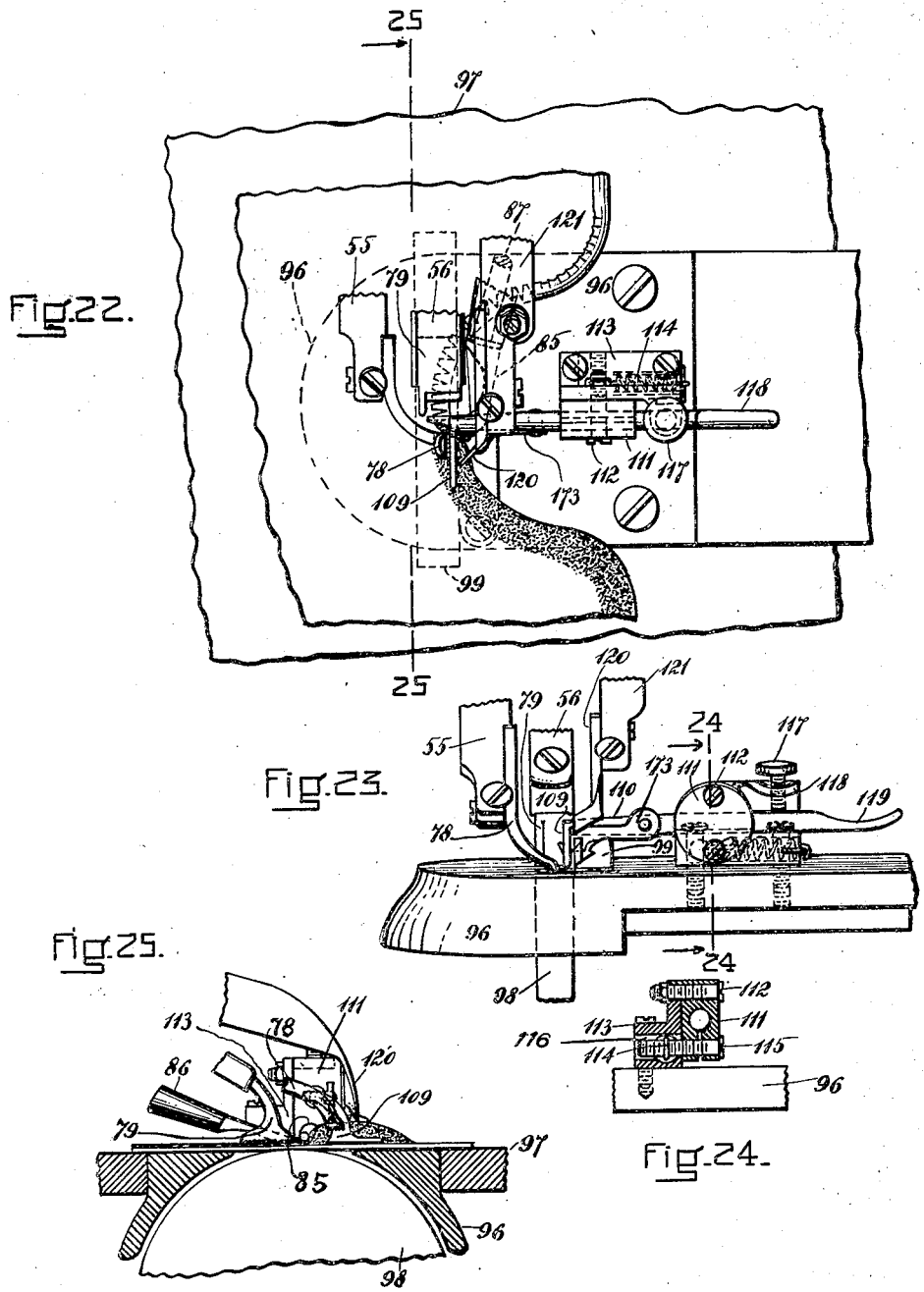
INVENTOR.
ANDREW R. RIDDERSTROM
BY
ATTORNEY.

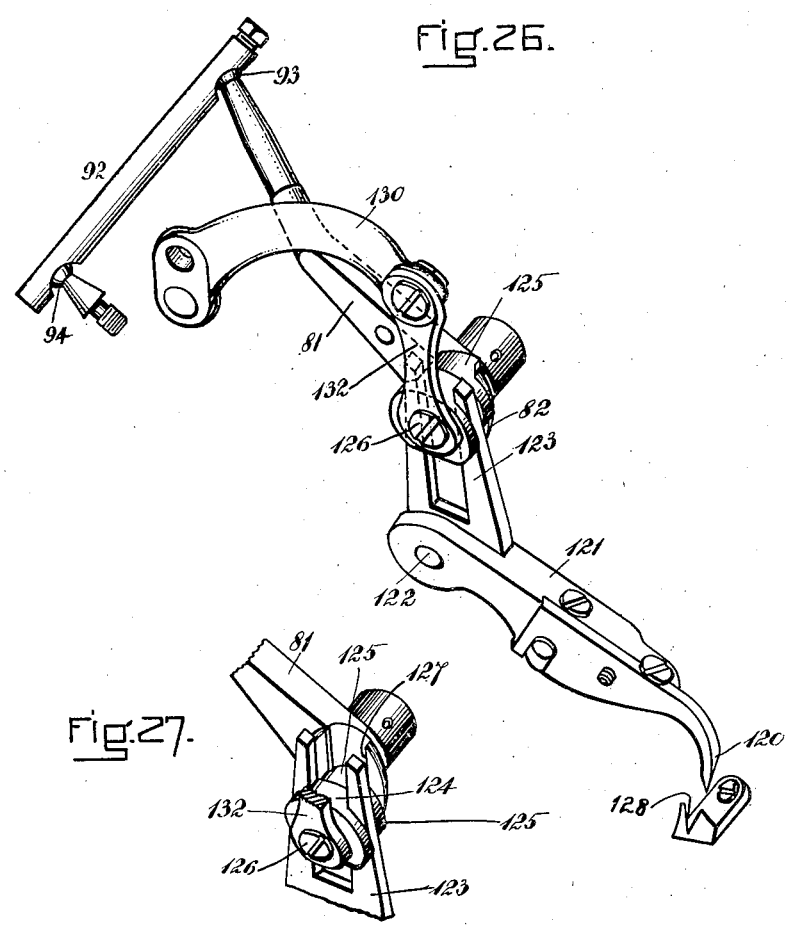

Jan. 2, 1934.   A. R. RIDDERSTROM   1,942,363
FOLDING MACHINE
Filed May 3, 1932   12 Sheets-Sheet 10

INVENTOR.
ANDREW R. RIDDERSTROM
BY
ATTORNEY.

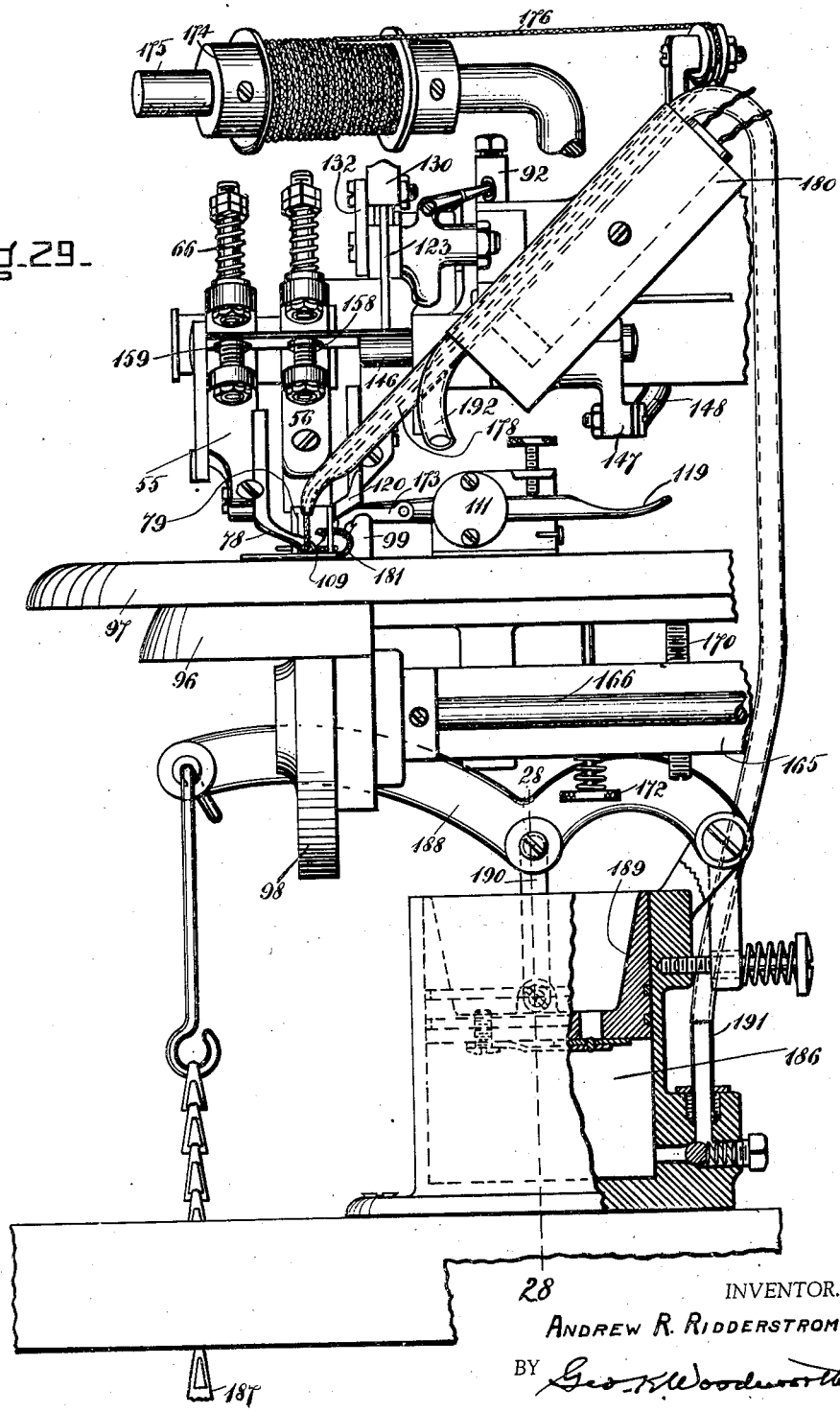

Jan. 2, 1934. A. R. RIDDERSTROM 1,942,363
FOLDING MACHINE
Filed May 3, 1932 12 Sheets-Sheet 12
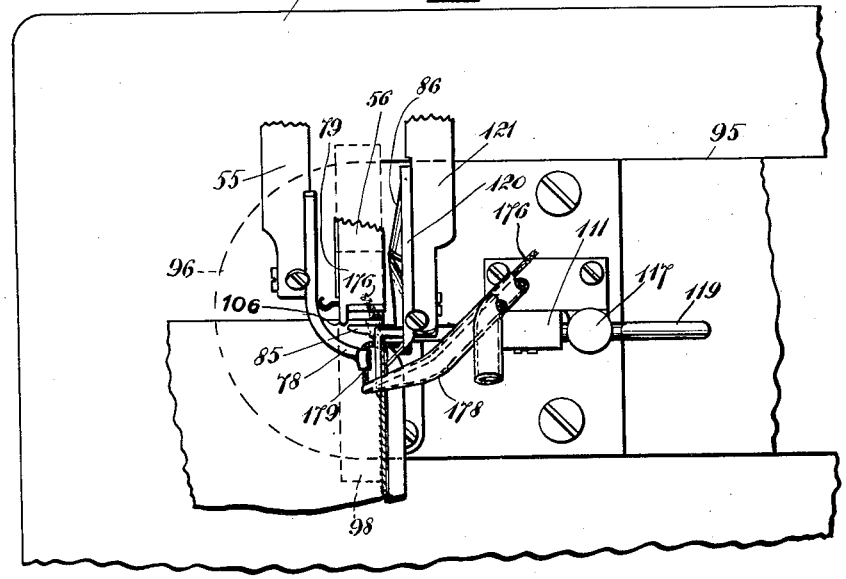
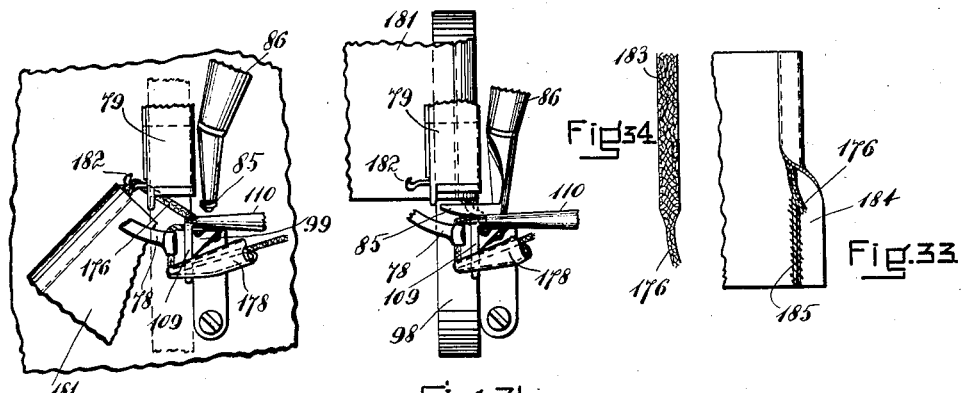
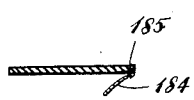  
INVENTOR.
ANDREW R. RIDDERSTROM
BY
ATTORNEY.

Patented Jan. 2, 1934

1,942,363

UNITED STATES PATENT OFFICE 1,942,363

FOLDING MACHINE

Andrew R. Ridderstrom, Nahant, Mass., assignor to Prime Manufacturing Company, Lynn, Mass., a corporation of Massachusetts Application May 3, 1932. Serial No. 608,919

32 Claims. (Cl. 12—54)

This invention relates to machines for folding the edges of sheets of flexible material, and more especially to machines for folding the edges of shoe uppers.

An object of the invention is to provide a machine whereby the material operated upon may be folded regularly and uniformly, especially when the margin of said material is curved, without forming points, puckers, or other irregularities.

Another object is to provide a machine in which the fold is determined by the distance between the folding mechanism and the fold-pressing mechanism, thereby eliminating the creasing devices of the prior art which are objectionable on account of the impossibility of producing uniform or regular work where the material operated upon is curved. A further object is to provide a machine in which the wiper or edge folder is located immediately to the rear of the fold presser when the latter is at or near the commencement of its forward movement so that said wiper operates to fold the portion of the edge of the material lying between said wiper and feed presser down on said material while the latter is being gripped and fed forward by the fold presser. Still another object is to provide a retainer disposed rearwardly of the wiper for holding the material down on the work support during its passage through the machine so that said material, during the operation of the wiper, is held by said retainer rearwardly of the fold or plait about to be formed and forwardly thereof by the fold presser which is then pressing the previously-formed fold down on the sheet of material.

A further object is to provide a substitute for the present practice of applying a layer of adhesive to the margin of the work, such substitute consisting of a fibrous cement carrier, such as a soft cord, which is impregnated or coated with cement, together with means for heating such carrier and thereby softening the cement, and means for applying said cord to the work, so that when the edge of such work is folded down over said cord, such edge will adhere to the work just as effectively as if the margin of such work had been coated with adhesive.

Various other objects of my invention will hereinafter appear in the detailed description of the illustrative embodiment shown in the accompanying drawings, it being understood, of course, that said drawings merely show the form of invention at present preferred and that they are not restrictive.

In the drawings—

Fig. 3 is a fragmentary plan partly in section, the plane of such section being indicated by the line 3—3 of Fig. 2 and Fig. 4;

Fig. 4 is a vertical section taken on the irregular line 4—4 of Fig. 3;

Fig. 5 is a side elevation on an enlarged scale of the work-feeding mechanism;

Fig. 6 is a kinematic diagram illustrating the motion of the work feeder;

Fig. 7 is a side elevation on an enlarged scale of the fold-presser mechanism;

Fig. 8 is a kinematic diagram illustrating the motion of the fold-presser;

Fig. 9 is a transverse section taken on the line 9—9 of Fig. 2;

Fig. 10 is a transverse section taken on the line 10—10 of Fig. 2;

Fig. 11 is a perspective view of the wiper and a portion of the actuating mechanism thereof, as seen from the front of the machine, i. e. the side of the machine away from the operator and toward which the work is fed;

Fig. 12 is a vertical section taken on the line 12—12 of Fig. 2;

Fig. 13 is a fragmentary plan view, partly in section, of a detail of construction, the plane of such section being indicated by the line 13—13 of Fig. 10;

Fig. 14 is a vertical section of said detail of construction taken on the line 14—14 of Fig. 10;

Fig. 15 is a plan view of the combined plow and cutter block;

Fig. 16 is a side view, and Fig. 17 an end view, of said plow and cutter block;

Fig. 18 is a perspective view on an enlarged scale showing the relation of the fold presser, wiper and work feeder at the moment said wiper has folded a portion of the edge of the material back on itself in a case where the margin of the work is straight;

Fig. 19 is a perspective view showing the relation of the parts when the wiper has almost completed a plait on the material, the curvature of which is convex;

Fig. 20 is a perspective view showing the step in the operation on convex work immediately following that shown in Fig. 19, viz, the wiper and fold presser are out of engagement with the work and the feeder is moving the work forward for action by said wiper;

Fig. 21 is a perspective view showing the relation of the several parts employed for feeding, folding and pressing in the case of a concaved curved sheet of material;

Fig. 22 is a plan view on an enlarged scale of a modification comprising the retainer hereinbefore mentioned;

Fig. 23 is a perspective view of said modification;

Fig. 24 is a vertical section taken on the line 24—24 of Fig. 23;

Fig. 25 is a vertical section taken on the line 25—25 of Fig. 22;

Fig. 26 is a perspective view of the mechanism preferred by me for actuating the slitting or cutting mechanism;

Fig. 27 is a fragmentary perspective view of a portion of the mechanism shown in Fig. 26 illustrating the position of the parts when the cutter is in operation;

Fig. 29 is a front elevation of the modification shown in Fig. 28;

Fig. 30 is a fragmentary plan view showing the relation of the folding, feeding and pressing instrumentalities illustrated in Fig. 28 at the point where the work is entering the machine;

Fig. 31 is a similar plan showing such relative positions when the work is leaving the machine;

Fig. 32 is a similar plan illustrating the cutting of the cement carrier as the work is removed from the machine;

Fig. 33 is a fragmentary plan view on an enlarged scale showing a portion of a shoe upper in which a binding strip, commonly called a "French cord", has been folded over the edge of the upper and pressed down against the cement-carrying cord above-mentioned;

Fig. 34 is a plan view of said cement-carrying cord showing a portion thereof flattened by the operation of the wiper and fold presser;

Fig. 35 is a transverse section of a shoe upper having a binding strip stitched to the finished or grain side thereof, in the usual manner;

Fig. 36 is a similar section showing the first step in folding said strip down on the unfinished or flesh side of the upper;

Fig. 37 is a similar section showing the binding strip secured to the unfinished or flesh side of an upper by means of the cement-impregnated cord aforesaid.

Figure 1:
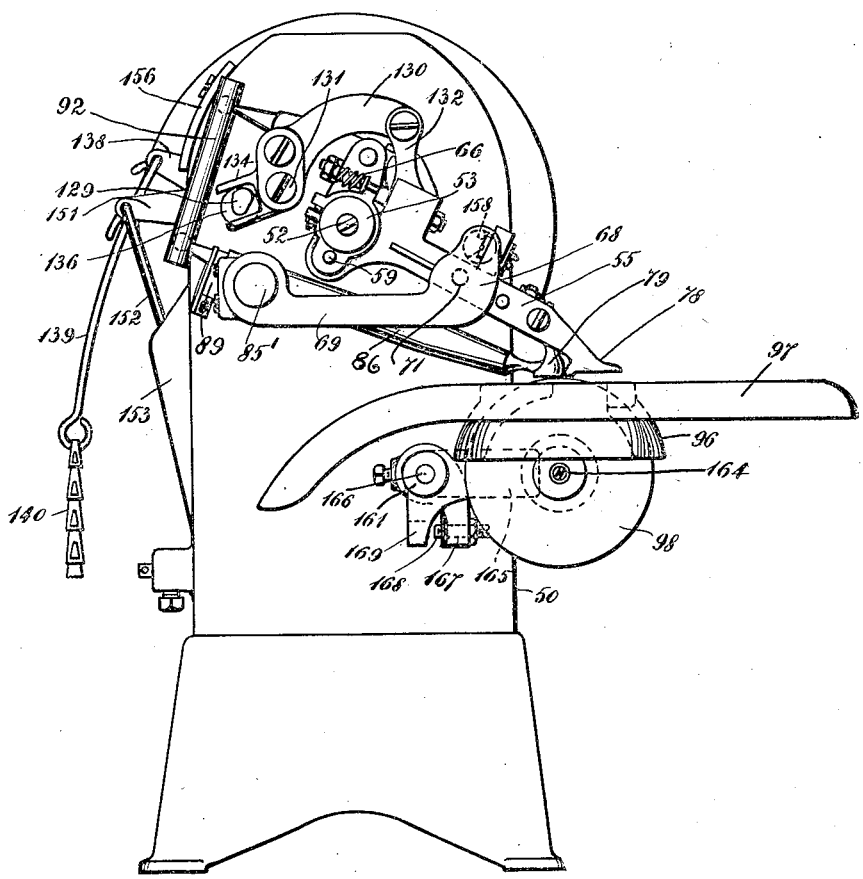
Figure 1 is an end elevation of a folding machine embodying my invention.
Figure 2:
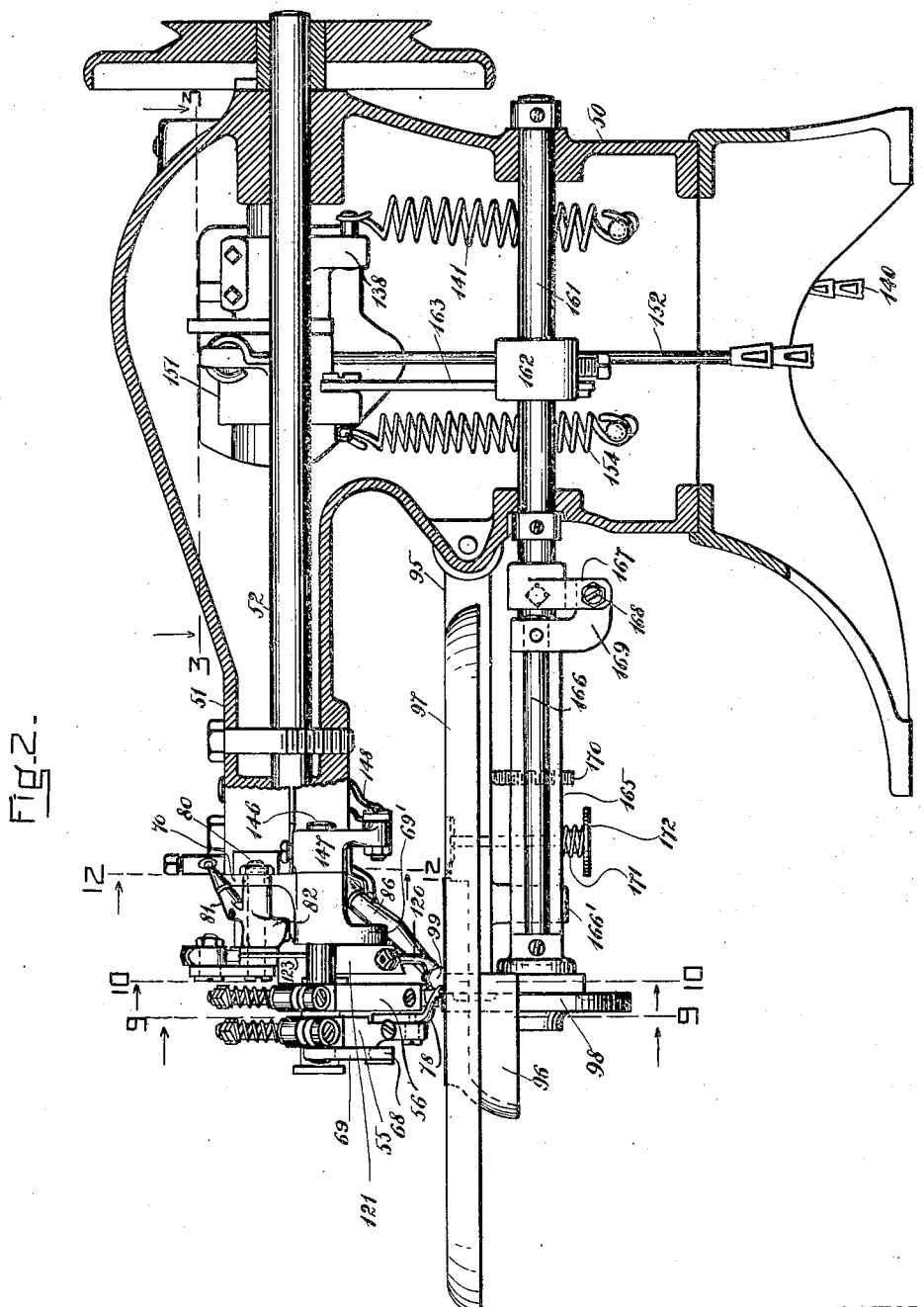
Fig. 2 is a side elevation partly in section, the plane of the section being shown by the line 2—2 of Fig. 3.

Referring particularly to Figs. 1 and 2, the illustrative embodiment of my invention selected for more fully disclosing the underlying principles thereof comprises a hollow frame 50 having an overhanging arm 51 in which is journalled a drive shaft 52 carrying near its outer end a pair of oppositely-disposed eccentrics 53, 54 (Figs. 5, 7 and 9) for actuating the feeder bar 55 and the fold-presser bar 56, respectively, through the intermediary of the straps 57, 58, pivotally connected at 59, 59', respectively, to said feeder bar and fold-presser bar, and the collars 60, 61, between which collars and abutments 62, 63, the fingers 64, 65 of the eccentric straps are respectively disposed, the springs 66, 67 holding said collars against said fingers. Secured to and extending inwardly from the fixed arm 68 forming a portion of a bracket 69 integral with the plate 70 bolted to the free end of the overhanging arm 51, is a stud 71 carrying two eccentrics 72, 73 (Figs. 5, 7, 9) arranged, respectively, intermediate the driving eccentrics 53, 54 and the ends of the feeder bar 55 and the presser bar 56. By means of the arrangement just described, there is imparted to the ends of said bars alternately a right-line motion in one direction, (forwardly, or away from the operator), and an oscillatory motion in the opposite direction, as indicated in Figs. 6 and 8, respectively, in which the line 74 indicates the rearward oscillatory movement of the end of the feeder bar and the line 75 the forward right-line movement of the same, while the line 76 shows the rearward oscillatory movement of the end of the presser bar and the line 77 the forward right line movement thereof.

Reference is made to my prior Patent 1,794,204, February 24, 1931, for a more complete explanation of the means whereby the motions aforesaid are obtained.

Secured to the end of the feed bar is a work-feeding finger 78 of any suitable shape which feeds the work-step-by-step forwardly through the machine while a fold presser 79 is attached to the end of the presser bar and performs the function of pressing a previously formed fold and simultaneously therewith feeding the work forwardly through the machine while the feeder is making its rearward oscillatory movement. A stud 80 extends outwardly from the plate 70 and on said stud is mounted a bell crank comprising the arms 81, 82 (Figs. 10 and 26), and said bell crank is rocked or oscillated by the eccentric 83 on the drive shaft and the link 84 articulated between said eccentric and arm 81.

The upper arm 81 actuates the folder or wiper 85 in the following manner: Passing through and secured to the bracket 68 is a stud 85' (Figs. 9, 10, 11), provided at its inner end with a housing 85'' for the sleeve 86, extending downwardly and rearwardly toward the wiper and fold presser and within which the shank 87 of the wiper 85 has its bearing. Rigidly connected with the rearward end of said shank is a segmental arm 88, connected to the face of which, for any desired adjusted position, is the segmental plate 89. In the present instance, the relative adjustment of the plate 89, with respect to the arm 88, is effected by the screw 90 passing through the curved slot 91 in said plate 89 and having threaded engagement with the arm 88. The segmental plate 89 is articulated with the bell-crank arm 81 by means of the link 92, and the two universal joints 93, 94. By virtue of this construction there is imparted to the wiper 85, a peculiar oscillatory motion in a plane which forms an acute angle with the plane of the motion of the feeder and fold presser and also an acute angle with the plane in which the work moves through the machine.

An arm 95, integral with the machine frame, extends outwardly and under the folding, feeding and pressing instrumentalities and terminate in a work table 96 having a bell-shaped end. Suitably supported by said arm and work-table, and surrounding the same, is a larger work-table 97. Pivotally connected to the under side of said arm, as hereinafter more fully described, is a revoluble work-support 98 which projects through a slot in said work-table for co-operation with the work feeder, wiper and fold presser.

A combined plow and cutter block 99 (Figs. 15, 16, 17) is attached to the work table by a screw 100 passing through the hole 101 in the end of the plate with which said plow and cutter block are integrally formed, and said arm is held in adjusted position by the screw 102 passing transversely through the work table 96 and taking against the side of said plow. (Fig. 18).

The preferred operation of the mechanism above described is as follows, having reference to Figs. 18 to 21, inclusive:

A sheet of flexible material 103, such as a piece of leather from which a vamp, quarter, or other shoe upper part is placed against the plow and under the feeder and as it is fed through the machine, the edge thereof is turned up. The wiper 85 which, as aforesaid, has an oscillatory motion angularly related to the direction of movement of the work through the machine moves against the upstanding edge of the work and presses the same down on the sheet of leather or other material, the margin of which previously has been coated with adhesive, as indicated at 104. Further movement of the work through the machine brings the fold or plait under the fold presser 79 which as clearly shown in Fig. 19 is wide enough to press such fold or plait firmly down on the stock from the folded edge inward. Simultaneously with pressing the fold from the folded edge inward, the fold-presser feeds the work forward. By so designing the fold presser, the stock is held firmly down during the action of the wiper, thereby preventing the wiper from turning up the previously folded edge and curving or twisting the sheet of material.

The proper timing of the folding, feeding and pressing mechanism is of the utmost importance for securing uniform and regular work. The timing preferred by me is substantially as follows, but it is to be understood that I do not limit myself precisely to the cycle about to be described, viz, (1) the feeder being near the end of its rearward stroke and about to move downwardly on the work and begin its forward right line stroke to move the work forwardly through the machine, the folder presser is near the end of its forward stroke and is gripping the work against the revoluble work support 98. The wiper now starts to fold a portion of the upstanding edge of the sheet of material back on itself and up against, or at least near to, the rearward face of the fold presser. Thus it will be seen that the fold presser is gripping the work and feeding it forward while the wiper is making a fold up to the point at which the fold presser is gripping the stock and pressing a previously formed fold, such fold or plait, as the case may be, being determined by the distance between the wiper 85 and the rearward edge of the fold presser 79 at the instant the wiper comes in contact with the upstanding edge of the stock. By referring to Fig. 18, it will be noted that the finger or end of the wiper is at an angle to the head 105 which in turn is angularly related to the axis of the shank 87, so that as said shank is oscillated about its axis, said finger moves both downwardly and forwardly, thereby wiping over the upstanding edge of the stock, as well as pressing the latter down on said stock. (2) The feeder is still moving downwardly toward the stock (say, at about the point $a$, Fig. 6) and is not yet in contact with the same, the fold presser is still gripping the stock and is now at the end of its forward stroke and the wiper has reached the end of its down stroke and is pressing a fold or plait against the work. The position of the parts is substantially that shown in Fig. 18. It will be noted that the finger of the wiper is immediately to the rear of, and in fact, almost in contact with, the rearward face of the fold presser. (3) The fold presser having reached the end of its forward right line movement now begins its oscillatory rearward stoke (point $b$, Fig. 8), shortly thereafter, and preferably not simultaneously therewith, the wiper begins to rise and move away from the stock, and the feeder has moved down on the stock, making contact therewith immediately before the wiper moved away from the stock and commences its forward right line feeding stroke (see point $c$, Fig. 6). (4) The feeder continues its forward right line movement and brings the next adjacent portion of the upstanding edge in position to be operated upon by the wiper, and feeds the previously formed fold in position to be pressed by the fold presser, the wiper continues its oscillatory stroke away from the stock and the fold presser continues its oscillatory rearward stroke. (5) The fold presser has now completed its oscillatory rearward stroke, grips the stock, presses the previously formed fold and begins its right line forward movement, thereby feeding the stock, the wiper having completed its oscillatory movement away from the stock now moves in the opposite direction toward the upstanding edge of the stock, the feeder having reached the end of its forward or feeding stroke at just about the time that the fold presser has finished its rearward oscillatory movement and has gripped the stock, is now rising and beginning its oscillatory rearward movement ($d$, Fig. 6).

Consideration of the foregoing cycle of operations in connection with Fig. 18 will show that the stock is at all times held against the work support, herein shown as the disc 98, either by the fold pressure or the feeder, and that during the operation of laying a fold or plait, the stock is firmly gripped by the fold presser whereby the fold is determined by the distance existing between the wiper at the instant the latter comes in contact with the upturned edge of the material and the rearward edge of the fold presser. By so timing these instrumentalities, I can secure regular and uniform folding at a high rate of speed, without the formation of puckers and points, and this is more especially true where the curvature of the work is convex or concave, as shown in Figs. 19 and 21, respectively.

So far as I am aware, it is broadly new to fold the edge of flexible material while the same is being gripped and fed forward by mechanism disposed forwardly of the wiper. In this connection it is to be observed that the wiper is located rearwardly of the feed presser when the latter is in stock-feeding position (point $e$, Fig. 8), and is at or near the beginning of its forward right line stroke.

In Figs. 19 and 20 I have represented the positions of the parts when operating on the convex portion of a sheet of material. The finger 106 projecting rearwardly from the fold presser, is extremely useful in folding the edge of work, the curvature of which is convex, and in such case the plaits can be laid rapidly without puckering, the said finger serving to press a previously formed plait down on the work. Fig. 20 shows the position of the parts when the wiper has moved against the upstanding edge of the stock and is about to lay a plait. Fig. 19 shows the stage at which the wiper has almost completed its downward stroke while the said finger 106 is pressing the previously formed plait.

Upon the completion of the downward movement of the wiper, the end thereof will be immediately behind the finger 106 of the fold presser. By means of the present invention, it is possible to fold the edge of a narrow strap such as shown at 107 in Figs. 19 and 20 evenly and regularly and without distorting said strap. It has been found that said finger 106 is useful on short curves, either convex or concave.

In Fig. 21 the positions of the several instrumentalities are indicated when folding the edge of a sheet 108, the curvature of which is concave, the wiper being shown at the point in the cycle where it has laid a tongue or flap while the fold presser is pressing those previously laid.

I shall now describe a modification which has been found particularly useful for light work. Referring to Figs. 22, 23, 24 and 25, 109 is a retainer consisting, in the present instance, of a foot disposed transversely of the wiper for holding the material down on said table. Said foot is mounted on the stem 110 and to the latter, intermediate the ends thereof, is secured the disc 111 pivoted at 112 to the bracket 113 which in turn is fixed to the work table 96. By means of the spring 114 connected between one end of said bracket and the screw 115 passing through said disc and a slot 116 in said bracket, the retainer is held against the stock with a pressure that is regulated by the screw 117 which is threaded through a lug 118 projecting from said bracket and acts as a stop to limit the upward movement of the stem to which the retainer is attached. The free end of said stem may be provided with the finger-piece 119.

When said retainer is used the work is held against the table or support by the fold presser and retainer or by the fold presser and feeder, and thus said retainer constitutes an additional safeguard for the prevention of puckers and irregular folding when the stock operated upon is light. It is not to be understood, however, that said retainer is useful only when the machine is operating on light stock because experience has shown that it is useful in the folding of uppers of the usual thickness.

Cutting or slitting mechanism

For folding the edges of stock, the curve of which is concave ("inside work"), it is desirable to snip the margin of the material so as to form flaps or tongues which are successively folded down on the sheet, as indicated in Fig. 21. For this purpose, I prefer to employ an oscillating cutter working in substantial synchronism with the wiper and co-operating with a cutter block which, as aforesaid, preferably is formed integral with the plow 99.

The cutter 120 (Figs. 10 and 26) is shown in the present instance as mounted on the arm 121 of a bell crank pivotally connected at 122 to the arm 69' of the bracket 69 which, as aforesaid, is integral with the plate 70 bolted to the end of the overhanging arm 51.

The other arm 123 of said bell crank is slotted to receive the block 124 arranged to slide therein and to which the key 125 is pivotally connected by the stud 126. The outer face of the bell crank arm 82 is provided with a keyway 127 in which said key is arranged to slide. Normally, the studs 80 and 126 are in alignment and the rocking movement imparted to the bell crank 81, 82 by the cam 83 and link 84, as above set forth, is not imparted to the bell crank 121, 123, but as will be obvious, if the block 124 is moved out of its normal position and the stud of said key thereby moved out of alignment with the stud of the bell crank 81, 82, the oscillatory motion of the arm 82 will be imparted to the arm 123 and thereby the cutter will oscillate, the movement of the latter being from the position shown in Fig. 10 down into the slot 128 of the cutter block which, of course, is provided with a sharpened edge co-operating with said cutter.

For moving the block 124 out of its normal position so that the cutter may be actuated at the will of the operator, I prefer to employ treadle-actuated means for turning the cam 129 whereby the arm 130, pivoted to the plate 70 at 131, is caused to impart a downward movement to the link 132 which connects said block 124 to said arm. A convenient means for effecting the co-operation of said cam 129 and arm, consists in a plate 133 having a fork 134 extending transversely therefrom and rigidly secured to the arm 130 in adjusted position by the screw 135, but it is to be understood that a variety of means may be devised for regulating the stroke of the cutter and connecting the same for operation at will.

The said cam 129 is formed on the end of a rod 136 (Figs. 1, 3 and 4) disposed within the sleeve 137 which is mounted for oscillation in the upper forward portion of the frame (see Fig. 3). The arm 138 is rigidly connected to said shaft 136 and the outer end thereof is connected to a treadle (not shown) by the link 139 and chain 140. The arm 138 is held in normal position by the spring 141 connected between the inner end thereof and a stud 142 projecting inwardly from the frame of the machine.

It will be obvious that when the treadle is depressed, the arm 138 will rock the shaft 136 counterclockwise, from the viewpoint of Fig. 4, and through the mechanism already described, the block 124 is moved downwardly toward the pivotal connection 122 of the bell crank 121, 123, thereby actuating the knife. A stud 143, having threaded engagement with the rock shaft 136, projects radially therefrom through a slot 144 in the sleeve 137. In order to connect the cutter with its actuating mechanism, it is necessary only to rotate the shaft 136 sufficiently to bring said stud 143 to the dotted line position 143' shown in Fig. 4, viz, in contact with the end 145 of the slot. Further movement of said rock shaft and stud 143 will serve to rock the sleeve 137 and thereby control the operation of the mechanism for varying the rate at which the work is fed through the machine.

Feed control mechanism

Mounted between the ends of the bracket 69 and projecting through the arm 69' thereof is a rock shaft 146 to which is rigidly attached the depending arm 147 (Figs. 2 and 12) and the latter is connected by the link 148 to the arm 149 which is rigidly secured to the sleeve 137 by the clamp 150 whereby the rocking movement or oscillation of said sleeve will impart similar movement to said rock shaft 146. Rigidly connected to said sleeve at or near the inner end thereof is a rocker arm 151, one end of which is connected, as by the link 152, passing through the pocket 153 of the frame, with a treadle (not shown) while the other end of said arm is connected by the spring 154 to the stud 155 projecting inwardly from the machine frame. Suitable stops 156 and 157 may be provided to limit the movement of the arm 151. The rock shaft 146 is provided with a cam surface 158 arranged to co-operate with adjustable abutments 159 secured to lugs 160 which preferably are formed integral with the feeder bar 55 and presser bar 56. When the arm 151 is moved by its connected treadle toward the stop 157, the said rock shaft 146 is given a partial rotation whereby said cam surfaces 158 co-operating, as aforesaid, with the abutments 159, serve to limit the forward right line movement of the feeder and fold presser, the amount of such limitation depending, of course, upon the amount of rotation imparted to the sleeve 137, and this in turn depending upon the extent of movement of the treadle connected to the link 152. Further forward movement of the bars 55 and 56 being impeded by the aforesaid movement of the cam surfaces 158, it follows that means must be provided for taking up the motion which otherwise would be imparted to said bars by the fingers 64, 65 of the eccentric straps 57, 58 pivotally connected to said bars at 59, 60, respectively. Such means is afforded by the springs 66, 67 (Figs. 5 and 7) which constitute resilient means for connecting the eccentric straps to their respective arms. Said springs, of course, must be of sufficient strength to resist compression when the cam surfaces 158 are in their normal positions and as they are not compressed under normal conditions, they permit the full forward movement to be imparted to the bars by the eccentric straps.

Referring again to Figs. 6 and 8, the line c—f indicates the extent of feeder travel when the rock arm 151 is given a slight rotation by its co-operating treadle, and the line c—g, the extent of such travel when said treadle is further depressed. As indicated by the point h, it is possible to reduce the extent of feeder travel to practically zero. Similarly, in Fig. 8 the points of intersection of the three dotted lines with the base line 77 indicate the variations of fold-presser right-line travel effected by the operation of the treadle which controls the movement of the rocker 151.

*Control of feed-reducing mechanism by cutter-mechanism control*

As above stated, the cutter is rendered operative when, by means of the treadle which controls the rocker 138, the rock shaft 136 is given such movement as to bring the stud 143 against the end of the slot 145. Further movement of said treadle arm and said rocker will cause said stud to impart the movement of the shaft 136 to the sleeve 137 and thereby vary the extent of forward right line movement of the feeder and presser bar.

*Control of work support by feed-reducing-mechanism control*

To a short shaft 161 mounted in the lower portion of the frame (Figs. 3 and 4) is rigidly attached an arm 162 articulated to the inner end of the rocker 151 by the link 163. As indicated in Fig. 4, when said rocker 151 has the dotted line position 151', the arm 162 will be moved to the position 162' and the rock shaft 161 given a slight counterclockwise rotation from the viewpoint of Fig. 4. The revoluble work support 98 is mounted for rotation on a stud 164, which stud projects from one arm of the bracket 165, and said bracket is mounted for rocking movement on the rod 166. One end of said rod is journalled in the bracket 166' on the under side of the work table and the other end in the end of the rock shaft 161. A finger 167, rigidly secured to said shaft 161 carries a screw 168 which takes against the lower end of a finger 169 depending from said bracket 165, so that the rocking movement imparted to said shaft 161 by the rocker 151 which, as aforesaid, controls the operation of the feed-reducing mechanism, will cause the frame 165 and the work support carried thereby to move about the shaft 166 and away from the work table.

It is to be understood of course that a partial movement only of the treadle connected to the link 152 will suffice to control the feed-reducing mechanism, and that further movement thereof is required to bring the screw 168 against the finger 169 for the purpose of moving the work support out of co-operation with the folding and feeding mechanisms, to facilitate the removal of work from, or the insertion of work into, the machine.

It will be observed that the feed control mechanism, while independent of the cutter-control mechanism may, nevertheless, be actuated by the means, viz, the treadle connected to the rocker arm 138, which controls the cutter. These are important features of my invention because when folding the edge of a concave sheet having large radius of curvature such as shown at 108 in Fig. 21, it is necessary to slit the edge but unnecessary to reduce the rate of feed of the stock through the machine, while on a sharp concave curve, or one having a small radius of curvature, it is desirable both to slit the edge and to reduce the feed rate. In folding a sheet having a convex curvature, slitting is unnecessary, and if the radius of such curvature is small, as in the case of the strap shown at 107 in Fig. 19, the rate of feed must be reduced corresponding, in certain degree, with the radius of curvature, and in such case the treadle connected to the rock arm 151 is used to reduce the feed rate.

Referring to Fig. 22 in which is shown a sheet having a compound curve, of which the convex portion is of relatively small, and the concave portion of relatively large, radius, in folding the convex portion the rate of feed will be reduced by depressing the treadle connected to the rock arm 151, and as soon as the concave portion is reached, said treadle will be released and the treadle connected to the rock arm 138 depressed to slit the concave edge. If, however, said concave edge had a radius of curvature as small as the convex portion of the curved stock shown in Fig. 22, then the last-mentioned treadle would be further depressed for the purpose of actuating both the slitting and the feed-reducing mechanism.

It will be understood, of course, that just as the rate of feed is reduced progressively by the distance through which the treadle connected to the rocker 151 is depressed, so also such feed rate is reduced progressively by the distance through which the treadle connected to the rocker 138 is depressed from and after the point at which the movement of said treadle brings the stud 143 in contact with the end 145 of the slot 144.

A stop 170, passing through the bracket 165 limits the position of the latter with respect to the work table and a spring 171, around the adjusting screw 172 and interposed between the head thereof and the bracket 165, serves to maintain the revoluble work-support 98 in yielding engagement at all times with the retainer and also with the feeder, fold-presser and wiper whenever such instrumentalities are in co-operation with said work-support.

In the modification shown in Figs. 22 and 23, an adjustable edge-gauge 173 may be mounted on the stem 110 of the retainer.

*Fibrous cement carrier*

Heretofore it has been customary to apply a coating of adhesive to the edge of the sheet to be folded, as shown at 104, Fig. 18. By means of the embodiment of my invention shown in Figs. 28 and 29, I am enabled to eliminate the necessity for the application of such adhesive to the stock.

Figure 28:
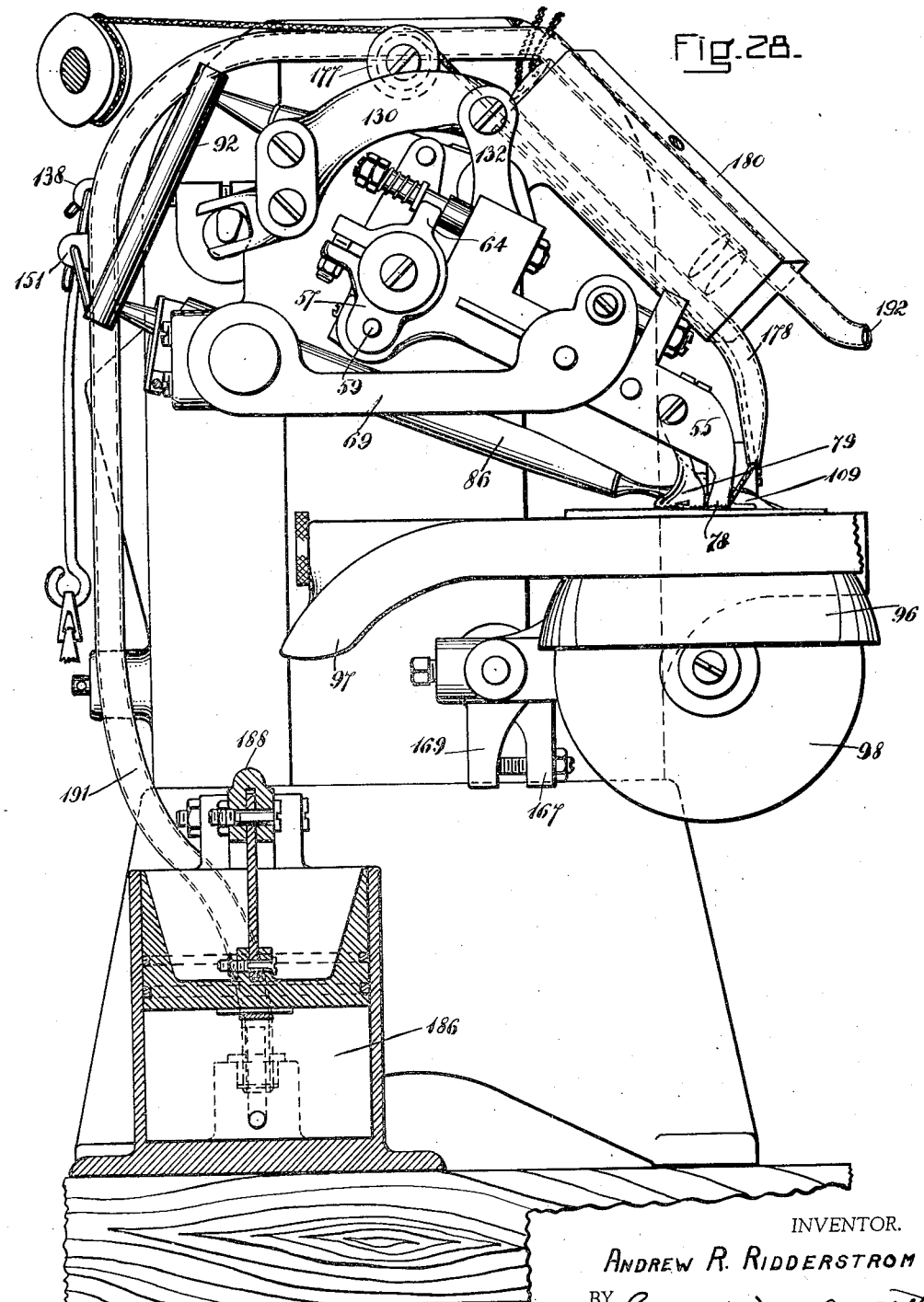
Fig. 28 is an end elevation, partly in section, of a modification illustrating the use of the cement carrier aforesaid, the plane of such section being indicated by the line 28—28 of Fig. 29.

Referring to Figs. 28 and 29 showing the machine heretofore described, a spool 174 is mounted on a suitable support 175 and has wound thereon a fibrous cement carrier such as the soft cord 176, the surface of which is coated with a suitable adhesive, such adhesive being allowed to dry before the cord is wound on the spool. The cord passes over the roller 177, or other suitable guide and through the tube 178, the lower end of which terminates near the folding and feeding instrumentalities to facilitate the application of the cord to the stock near the margin thereof. In the present instance the feeder 78 is arranged with a longitudinal opening 179, that is, an opening extending therethrough in the direction of motion thereof, through which the cord passes.

When the stock is placed in the machine, the end of the cemented cord is pulled through the opening in the feeder and pressed down on the material, the adhesive coating having previously been softened by the heater 180, shown in the present instance as an electric heater through which the tube 178 passes. The stock is then fed through the machine in the manner above described and the folded edge caused to adhere to said stock by being folded over, and pressed down upon, the said cement-coated cord which takes the place of the adhesive coating heretofore employed for this purpose. The relation of the parts shown in Fig. 30 indicates that the wiper has pressed a portion of the upstanding edge of the stock back on the sheet and over the cord 176 while the finger 106 of the fold presser is gripping the forward edge of the stock. Fig. 31 shows the position of the parts at the end of the folding operation. The fold presser will now make a few more strokes and carry the stock 181 out of the machine whereupon the operator will remove it by drawing it to the left, as shown in Fig. 32, passing the end of the cord over the cutter 182 which conveniently may be secured to the side of the fold presser, drawing the same over the cutter and thereby severing the cord. As indicated in Fig. 34, the cement-coated cord 176 will be flattened, as shown at 183 after the fold has been pressed down over the same. For convenience of illustration, the cutter 120 has been omitted from Figs. 31 and 32.

The machine shown in Figs. 28 and 29 may be used for folding a binding strip 184,—"French cord", so called,—around the edge of an upper, as well as to fold the edge thereof in the manner heretofore described. In Figs. 33 to 37, inclusive, the several steps in the operation of folding such binding strip to the edge of the upper is shown. The said strip is stitched to the finished or grain side of the leather, as indicated at 185, and by the mechanism heretofore described, or any other suitable machine, the said binding strip is folded over the edge of the upper and pressed down on the cemented cord 176.

It is sometimes convenient to provide means whereby the cemented edge of a faulty fold may be softened for correction, and in the present instance I have shown such means in the form of an air pump 186 of any suitable construction operable by a treadle attached to the chain 187 suitably connected to the lever 188 which in turn is articulated to the piston 189 by the link 190 to force air through the duct 191 passing through the heater 180 and terminating at a point 192 in proximity to the folding and pressing instrumentalities.

Having thus described illustrative embodiments of my invention, without however limiting the same thereto, what I claim and desire to secure by Letters Patent is:

1. A machine for folding the edge of a sheet of flexible material comprising in combination, a plow for forming an upstanding edge on the material, a wiper, means imparting an oscillatory motion to said wiper to fold a portion of said edge down on said sheet, a fold presser disposed forwardly of said wiper, means imparting to said fold presser a forward right-line motion and a rearward oscillatory motion in a plane at an angle to the plane of motion of said wiper, a feeder disposed rearwardly of said wiper, and means imparting to said feeder a forward right line motion when said fold presser is making its rearward oscillatory movement and a rearward oscillatory motion when said fold presser is making its forward right-line movement.

2. A machine for folding the edge of a sheet of flexible material comprising in combination, a plow for forming an upstanding edge on the material, a wiper, means imparting to said wiper an oscillatory motion in a plane at an angle to the direction of movement of the material through the machine to fold a portion of said edge back on the material, a fold presser disposed forwardly of said wiper, means imparting to said fold presser a forward right-line motion and a rearward oscillatory motion in a plane at an angle to the plane of motion of said wiper, a feeder disposed rearwardly of said wiper, and means imparting to said feeder a forward right-line motion when said fold presser is making its rearward oscillatory motion and a rearward oscillatory motion when said fold presser is making its right-line movement.

3. A machine for folding the edge of a sheet of flexible material comprising in combination, a wiper for folding a portion of the upturned edge back on said sheet, a fold presser, and means imparting to said wiper and fold presser motions in angularly-related planes, such means being so correlated that said fold presser remains in engagement with the material while said wiper is folding a portion of said edge down on said sheet.

4. A machine for folding the edge of a sheet of flexible material comprising in combination, a wiper for folding a portion of the upturned edge back on said sheet, a fold presser for pressing such folded portion to the sheet, and actuating mechanism for holding said fold presser in engagement with such folded portion while the wiper is folding the next adjacent portion of said upturned edge down on said sheet.

5. A machine for folding the edge of a sheet of flexible material comprising in combination, a wiper for folding a portion of the upturned edge back on said sheet, a fold presser for pressing such folded portion to said sheet, sheet-feeding means, and actuating mechanisms for bringing said fold presser and sheet-feeding means alternately into engagement with the sheet and imparting to each a forward right-line motion while in such engagement.

6. A machine for folding the edge of a sheet of flexible material comprising in combination, a fold presser, means for bringing said fold presser into engagement with the folded edge of the sheet and imparting thereto a right line motion while in such engagement to move said sheet forwardly through said machine, a wiper in proximity to said fold presser and means imparting oscillatory motion to said wiper in a plane angularly related to the plane of motion of said fold presser.

7. A machine for folding the edge of a sheet of flexible material comprising in combination, a fold presser, a sheet-feeder, a wiper, means for imparting an oscillatory motion to said wiper, and means for giving said fold presser and feeder, alternately, a right-line motion in one direction and an oscillatory motion in the opposite direction.

8. A machine for folding the edge of a sheet of flexible material comprising in combination, a fold presser, a sheet feeder, a wiper, means for imparting an oscillatory motion to said wiper, and means for giving said fold presser and feeder, alternately, a forward right line motion and a rearward oscillatory motion.

9. A machine for folding the edge of a sheet of flexible material comprising in combination, a fold presser constructed and arranged to grip the sheet of material from the folded edge inward, means actuating said fold presser to grip the sheet of material from the folded edge inward and feed the same forward, a wiper located rearwardly of said fold presser when the latter is in sheet-feeding position, and means actuating said wiper to fold a portion of the edge of said sheet immediately rearward of said fold presser back on itself while said sheet is gripped and fed forward by said fold presser.

10. A machine for folding the edge of a sheet of flexible material comprising in combination, a fold presser, means actuating said fold presser to grip the sheet of material and feed the same forward, a wiper located rearwardly of said fold presser when the latter is in sheet-feeding position, and means moving said wiper against said material at an angle to the direction of motion of the latter to fold the portion of the edge of said sheet lying between said wiper and feed presser down on said sheet while the latter is being gripped and fed forward by said fold presser.

11. A machine for folding the edge of a sheet of flexible material comprising in combination, a fold presser, means actuating said fold presser to grip the sheet of material and feed the same forward, a wiper located rearwardly of said fold presser when the latter is near the beginning of its forward movement, and means giving said wiper oscillatory motion angularly related to that of said fold presser to fold a portion of the edge of the material back on itself while the fold presser is completing its forward movement.

12. A machine for folding the edge of a sheet of flexible material comprising in combination, a fold presser constructed and arranged to grip the sheet of material from the folded edge inward, means imparting to said fold presser a rearward oscillatory motion above the material and a forward straight-line motion in contact with said material, a wiper located immediately rearwardly of the point at which said fold presser begins its forward right-line travel, and means actuating said wiper to fold down on said material the portion of the edge thereof immediately behind said fold presser when the latter is at the beginning of its forward movement and is pressing the previously-formed fold from the folded edge inward.

13. A machine for folding the edge of a sheet of flexible material comprising in combination, means for pressing a fold and simultaneously feeding the material forward, means for folding a portion of the edge of the material back on itself while the previously-formed fold is being pressed and the material is being fed forward, and means acting after the cessation of the feeding effected by the first-mentioned means for further feeding said material forward.

14. The method of folding the edge of a sheet of flexible material which consists in turning the edge of said sheet upwardly while the same is moving forwardly, folding a portion of such upstanding edge down on said sheet, pressing such folded portion down on said sheet, and then folding the next rearward portion of said edge down on said sheet while the previously folded portion is being pressed against said sheet.

15. The method of folding the edge of a sheet of flexible material which consists in forming an upstanding edge on said sheet, gripping said sheet from the edge thereof inward and feeding the same forward, and folding a portion of such upstanding edge down on said sheet while the latter is being gripped and fed forward.

16. A machine for folding the edge of a sheet of flexible material comprising in combination, a work-support, folding mechanism co-operating therewith, feeding mechanism also co-operating with said work support, feed-reducing mechanism, a treadle, means actuated by a partial movement of said treadle for controlling said feed-reducing mechanism, and means actuated by a further movement of said treadle for moving said work-support out of co-operation with said folding mechanism and said feeding mechanism.

17. A machine for folding the edge of a sheet of flexible material comprising in combination, an arm, a stud pivotally connecting said arm to the frame of said machine, means for imparting an oscillatory motion to said arm about said stud, said arm being provided with a keyway, a bell crank pivotally connected to the frame of said machine, a block having sliding connection with one end of said bell crank, a key arranged to slide in said keyway, a stud pivotally connecting said key to said block, the stud of said keyway being normally in alignment with the stud of said arm, a cutter secured to the other end of said bell crank and treadle-actuated means for moving said block toward the pivotal connection of said bell crank to the frame of said machine whereby the stud of said key is moved out of alignment with the stud of said arm and the oscillatory motion of the latter is imparted to said bell crank and to the cutter connected thereto.

18. A machine for folding the edge of a sheet of flexible material comprising in combination, folding mechanism, a bell crank, a stud pivotally connecting said bell crank about said stud, means connecting one end of said bell crank to said folding mechanism, the other end of said bell crank being provided with a keyway, a second bell crank pivotally connected to the frame of said machine, a block having sliding connection with one end of said second bell crank, a key arranged to slide in said keyway, a stud pivotally connecting said key to said block, said studs being normally in alignment, a cutter secured to the end of said second bell crank, and treadle-actuated means for moving said block toward the pivotal connection of said second bell crank to the frame of said machine, whereby the stud of said key is moved out of alignment with the stud pivotally connecting the first-mentioned bell crank to the frame of said machine and the movement of the first bell crank is imparted to said second bell crank and to the cutter secured thereto.

19. A machine for folding the edge of a sheet of flexible material comprising in combination, an arm terminating in a sheet-feeding finger, an eccentric strap pivotally connected to said arm, a driving eccentric co-operating with said strap, resilient means connecting said strap with said arm, an eccentric arranged intermediate said driving eccentric and said feeding finger, a cam for limiting the forward movement of said arm and treadle-actuated means controlling said cam.

20. A machine for folding the edge of a sheet of flexible material comprising in combination, a fold presser having a rearwardly-projecting finger formed on the under surface thereof, a wiper arranged in proximity to said fold presser, and means for moving the end of said wiper downwardly against said material and immediately rearwardly of said finger when the latter is in contact with a previously formed fold.

21. A machine for folding the edge of a sheet of flexible material comprising in combination, a wiper for folding a portion of the edge of said material down on the sheet, means imparting an oscillatory motion to said wiper in a plane making an acute angle to the plane of movement of the material through the machine, a fold presser disposed forwardly of said wiper, and a spring-pressed retainer disposed rearwardly of said wiper.

22. A machine for folding the edge of a sheet of flexible material comprising in combination, a work-support, a wiper for folding a portion of the edge of said material down on said sheet, means disposed rearwardly of said wiper for holding said material down on said work-support during the passage of the sheet through the machine, and means disposed forwardly of said wiper for holding said material down on said work-support during the operation of said wiper.

23. A machine for folding the edge of a sheet of flexible material comprising in combination, a wiper, a retainer disposed rearwardly of said wiper for holding said material down on said work-support, and an adjustable edge guage attached to said retainer.

24. A machine for folding the edge of a sheet of flexible material comprising in combination, folding and pressing mechanisms, a heater, a treadle-actuated air-pump, and a conduit connected to the outlet port of said air-pump and passing through said heater, said conduit terminating in proximity to said folding and pressing mechanisms.

25. A machine for folding the edge of a sheet of flexible material comprising in combination a fold presser, a sheet feeder, a wiper, and actuating mechanisms for said fold presser, sheet feeder and wiper, said sheet-feeder and fold presser having motions in substantially the same vertical plane and said plane being substantially normal to the plane of movement of the material through the machine and the wiper having an oscillatory motion in a plane making an acute angle to the plane of motion of said sheet feeder and fold presser and to the plane of movement of the material through the machine.

26. A machine for folding the edge of a sheet of flexible material comprising in combination a sheet feeder, a fold presser and operating mechanisms for said sheet-feeder and fold presser, said mechanisms being correlated in a manner to bring said sheet-feeder and fold presser into contact with the material successively to move the same forwardly, the forward feeding movement of the one beginning at substantially the moment the forward feeding motion of the other ends.

27. A machine for folding the edge of a sheet of flexible material comprising in combination a fold presser, means for bringing said fold presser into engagement with the folded edge of the sheet and imparting thereto a forward feeding movement, a wiper for folding a portion of the upturned edge back on the sheet, and means imparting oscillatory motion to said wiper in a plane making an acute angle with the plane of motion of said fold presser and with the plane of movement of said sheet through the machine.

28. A machine for folding the edge of a sheet of flexible material comprising in combination a fold presser, means for bringing said fold presser into engagement with the folded edge of the sheet and imparting thereto a right-line motion while in such engagement to move said sheet forwardly through the machine, a wiper in proximity to said fold presser, and means imparting oscillatory motion to said wiper in a plane making an acute angle with the plane of motion of said fold presser and with the plane of movement of said sheet through the machine.

29. The method of folding the edge of a sheet of flexible material which consists in turning the edge of said sheet upwardly while the same is moving forwardly, folding a portion of such upstanding edge down on said sheet, pressing such folded portion down on said sheet and simultaneously moving said sheet forwardly, continuing the forward movement of said sheet through the machine and then folding the next rearward portion of said edge down on said sheet while the previously-folded portion is being pressed against said sheet.

30. The method of folding the edge of a sheet of flexible material which consists in feeding said sheet through the machine and simultaneously turning the edge of said sheet upwardly, continuing the forward motion of said sheet through the machine and simultaneously folding a portion of such upstanding edge down on said sheet, moving said sheet further through the machine and then pressing the previously-folded portion down on said sheet during such forward movement and simultaneously folding the next rearward portion of said edge down on said sheet while the previously-folded portion is being pressed against said sheet.

31. The method of folding the edge of a sheet of flexible material and adhesively securing the same to said sheet which consists in feeding a fibrous cement-coated filament to said sheet and applying the same thereto near the margin thereof and folding the edge of said material down on said sheet and over said filament, thereby flattening said filament and squeezing therefrom the cement wherewith the same is coated and causing the folded edge to adhere to the sheet by virtue of the cement thus applied to said sheet.

32. The method of folding the edge of a sheet of flexible material and adhesively securing the same to said sheet which consists in feeding a fibrous cement-coated filament to said sheet and applying the same thereto near the margin thereof, heating said filament and softening the cement carried thereby, and folding the edge of said material down on said sheet and over said filament, thereby flattening said filament and squeezing therefrom the cement wherewith the same is coated and causing the folded edge to adhere to the sheet by virtue of the cement thus applied to said sheet.

ANDREW R. RIDDERSTROM.